United States Patent [19]

Lenox et al.

[11] Patent Number: 5,358,734
[45] Date of Patent: Oct. 25, 1994

[54] PROCESS FOR PRODUCING A BLUE EMITTING LAMP PHOSPHOR

[75] Inventors: Joseph J. Lenox; Albert K. Fan, both of Towanda, Pa.

[73] Assignee: GTE Products Corporation, Danvers, Mass.

[21] Appl. No.: 158,083

[22] Filed: Nov. 24, 1993

Related U.S. Application Data

[60] Continuation of Ser. No. 984,000, Dec. 1, 1992, abandoned, which is a continuation of Ser. No. 712,387, Jun. 10, 1991, abandoned, which is a division of Ser. No. 330,586, Mar. 30, 1989, abandoned.

[51] Int. Cl.$^5$ .............................................. B05D 5/06
[52] U.S. Cl. ................................ 427/71; 427/67; 427/215; 427/346
[58] Field of Search .................... 427/67, 180, 215, 71, 427/64, 346

[56]  References Cited

U.S. PATENT DOCUMENTS 2,987,414  6/1961  Martyny ............................. 427/67
4,161,457  7/1979  Takahashi ...................... 252/301.4 R

FOREIGN PATENT DOCUMENTS 2132990  6/1987  Japan ..................................... 427/67

Primary Examiner—Janyce Bell
Attorney, Agent, or Firm—Elizabeth A. Levy; Robert F. Clark

[57]  ABSTRACT

A fluorescent lamp comprising a sealed envelope, a pair of opposing electrodes, a fill of inert gas and mercury and a phosphor coating on the internal walls of the envelope wherein the coating contains as at least one element thereof particles of europium activated barium magnesium aluminate having an average particle size of about 4 micrometers, less than about 5% of the particles having a size greater than 15 microns and less than about 5% of the particles having a size less than about 1 micron, said particles having on the external surfaces thereof a coating of sub-micron aluminum oxide having a surface area of from about 80 to about 120 square meters per gram, said coating being sufficient to impart stir in quality to said phosphor.

5 Claims, 1 Drawing Sheet

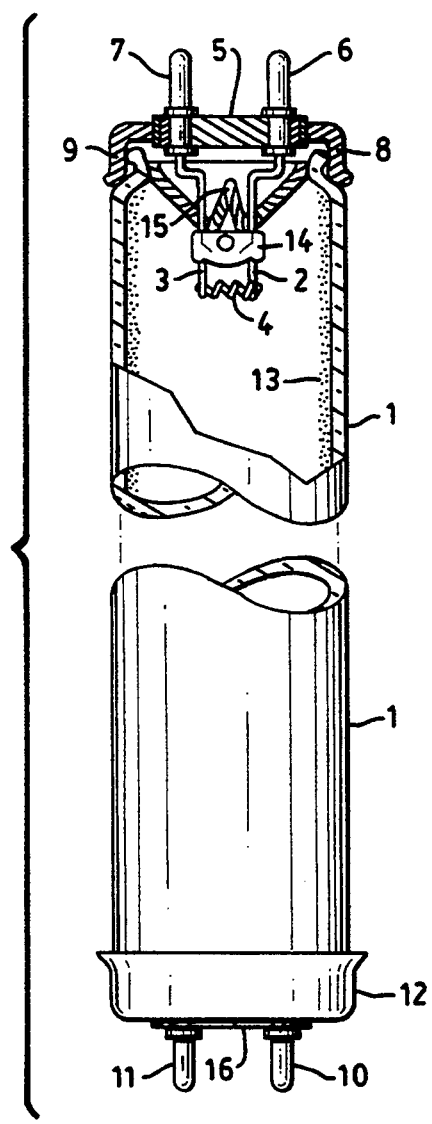

PROCESS FOR PRODUCING A BLUE EMITTING LAMP PHOSPHOR

This is a continuation of copending application Ser. No. 07/984,000, filed on Dec. 1, 1992, now abandoned, which is a continuation of application Ser. No. 07/712,387, filed on Jun. 10, 1991, now abandoned, which is a divisional of application Ser. No. 07/330,586, filed on Mar. 30, 1989, now abandoned.

FIELD OF INVENTION

This invention relates to fluorescent lamps, a process for producing same and a lamp phosphor utilized therein. More particularly, it relates to a fluorescent lamp utilizing a blue emitting europium activated barium magnesium aluminate lamp phosphor that is dispersed in the media used for the deposition of the phosphor via conventional stirring equipment. The lamps utilize substantially less blue phosphor to yield satisfactory brightness and color.

BACKGROUND

Prior to the present invention, blue emitting barium magnesium aluminate activated with europium had an average particle size of 9 micrometers as measured with Coulter Counter and 6 grams were required to coat a 40T12 test lamp. A phosphor that can be mixed with the media used to deposit the phosphor on the lamp via conventional stirring equipment and will result in a lamp with the same brightness with substantially less phosphor would be an advancement in the art.

SUMMARY OF THE INVENTION

In accordance with one aspect of this invention there is provided a fluorescent lamp comprising a sealed envelope, a pair of opposing electrodes, a fill of inert gas and mercury and a luminescent coating on the internal walls of said envelope having at least one component of the coating a phosphor composition consisting essentially of particles of europium activated barium magnesium aluminate having an average particle size of about 4 micrometers, less than about 5% of the particles having a particle size greater than about 15 micrometers and less than about 5% of the particle having a particle size less than about 1 micrometer, said particles having on the external surfaces thereof a coating of sub-micron aluminum oxide having a surface area of from about 80 to about 120 square meters per gram, said coating being sufficient to impart stir-in quality to said phosphor.

In accordance with an additional aspect of this invention there is provided an improvement in the process of making a fluorescent lamp comprising a sealed envelope, a pair of opposing electrodes, a fill of inert gas and mercury and a luminescent coating on the internal walls of said envelope said improvement comprising providing at least one component of the coating a phosphor composition consisting essentially of particles of europium activated barium magnesium aluminate having an average particle size of about 4 micrometers, less than about 5% of the particles having a particle size greater than about 15 micrometers and less than about 5% of the particle having a particle size less than about 1 micrometer, said particles having on the external surfaces thereof a coating of sub-micron aluminum oxide having a surface area of from about 80 to about 120 square meters per gram, said coating being sufficient to impart stir-in quality to said phosphor and forming the slurry used to deposit the blue emitting phosphor component by stirring the phosphor into the media using low shear mixing and thereafter depositing the phosphor on the internal walls of the envelope.

In accordance with another aspect of this invention there is provided a phosphor composition consisting essentially of particles of europium activated barium magnesium aluminate having an average particle size of about 4 micrometers, less than about 5% having a particle size greater than about 15 micrometers and less than about 5% having a particle size less than about 1 micrometer, said particles having on the external surfaces thereof a coating of sub-micron aluminum oxide having a surface area of from about 80 to about 120 square meters per gram, said coating being sufficient to impart stir-in quality to said phosphor.

In accordance with an additional aspect of this invention there is provided a process for producing a phosphor composition comprising
   a) forming a relatively uniform admixture of
      (1) a source of aluminum oxide,
      (2) a source of magnesium oxide,
      (3) barium halide
      (4) a source of europium and
      (5) barium carbonate
   wherein the atomic ratio of magnesium to aluminum in said blend is from about 0.93:11 to about 0.95:11 and the atomic ratio of europium to aluminum is from about 0.07:11 to about 0.09:11 and the atomic ratio of barium to aluminum is of from about 0.6:11 to about 0.65:11 and the molar ratio of the barium halide to barium carbonate is from about 14:86 to about 16:84,
   b) firing the admixture at a temperature of from about 1625° C. to about 1675° C. for at least about 3 hours in an mildly reducing atmosphere of hydrogen-nitrogen,
   c) dry milling the resulting fired material by vibratory milling of said fired material in the presence of a finely divided aluminum oxide having a particle size below 1 micron and a surface area of from about 85 to about 115 square meters per gram to thereby deagglomerate the fired material and coat the fired particles with a coating of finely divided aluminum oxide.

BRIEF DESCRIPTION OF THE DRAWING

The FIGURE is a perspective view partially broken away of the lamp of the invention.

DETAILS OF THE INVENTION

For a better understanding of the present invention, together with other and further objects, advantages, and capabilities thereof, reference is made to the following disclosure and appended claims in connection with the above description of some of the aspects of the invention.

The figure illustrates a lamp of this invention. The sealed glass envelope 1 has the lead-in wires 2, 3, sealed through one of its ends and corresponding lead-in wires sealed through the other end. The usual coiled-coil 4 of tungsten wire is supported between, and electrically connected to, the pair of lead-in wires 2, 3, and a similar coil is supported by and connected to the lead-in wires at the other end of the envelope 1. An insulating base piece 5 having contact pins 6 and 7, each pin being connected to one of the lead-in wires, held in the metal cap 8, which is fixed by the cement 9 to one end of the envelope 1, and a similar base piece 16, having contact pins 10 and 11, is cemented to the other end by cup 12.

The tungsten coils carry the usual electron-emitting coating of alkaline earth oxides, generally including also a small percentage of zirconium dioxide.

A filling of inert gas such as argon or a mixture of neon and krypton at about 2 millimeters of mercury pressure, and the usual small quantity of mercury is inside the glass envelope 1. The lamp has the usual stem press 14 and sealed exhaust tube 15.

On the inside surface of the envelope is a layer 13 which is a preferred embodiment which is a composite layer comprising a base layer of tin oxide. In practice, this layer may be formed by directing a fine spray of a tin hydroxide slurry against the inside surface of the glass envelope to build up a coating up to several microns in thickness. During a subsequent heat treatment the hydroxide is converted to an oxide of certain desired resistance. This tin oxide layer provides a base upon which the phosphor layer is formed, by conventional deposition techniques; however, prior to depositing the phosphor it is dispersed in the lacquer media by stiring the media and the phosphor with low shear mixing such as with conventional mixers. This phosphor layer may incorporate either the blue emitting phosphor alone or a blend of phosphors to yield a lamp having the desired color of emission.

In preparing the lamp, the blue emitting phosphor is incorporated into conventional aqueous or organic base lacquer systems for depositing luminescent coatings on the lamp. In the practice of this invention the blue emitting phosphor can be incorporated into the deposition media via low shear mixing using conventional stirring equipment. No milling is required to achieve uniform particle distribution or deagglomeration. If a blend of phosphors is utilized and the other phosphors require milling, those phosphors should be incorporated prior to the incorporation of the blue emitting phosphor of this invention.

To produce the phosphor of this invention a relatively homogeneous admixture of (1) a source of aluminum oxide, (2) a source of magnesium oxide, (3) barium halide, (4) a source of europium and (5) barium carbonate is formed wherein the atomic ratio of magnesium to aluminum in said blend is from about 0.93:11 to about 0.95:11 and the atomic ratio of europium to aluminum is from about 0.07:11 to about 0,09:11 and the atomic ratio of barium to aluminum is of from about 0.6:11 to about 0.65:11 and the molar ratio of the barium halide to barium carbonate is from about 14:86 to about 16:84. Magnesium oxide is the preferred source of magnesium oxide, although any source which will decompose to form magnesium oxide can be used. Europium oxide is the preferred source of europium oxide, although any source which will decompose to form europium oxide can be used. Aluminum hydroxide is the preferred source of aluminum oxide and aluminum hydroxide having an average particle size of about 13 micrometers is especially preferred. Barium carbonate is added so that the ratio of the barium atoms from barium halide, preferable barium fluoride, to those in the barium carbonate is about 15:85, although the ratio can range from about 14:86 to about 16:84. A uniform admixture is preferably achieved by dry blending the initial materials in any conventional dry blender with relatively mild agitation thereby preventing appreciable reduction of the particle size of the initial materials. After the admixture is formed it is fired at from about 1625° C. to about 1675° C. A mildly reducing atmosphere of nitrogen and hydrogen is used during the firing or heating step. The material is fired at the foregoing temperature for at least about 3 hours. Longer times can be used; however, times in excess of about 6 hours are not generally used because such times needlessly add to the cost of the process.

After the material is fired it is crushed and then deagglomerated in a vibratory mill such as a Sweco mill with alumina milling media and sub-micron aluminum oxide is added. The aluminum oxide has a BET surface area of from about 85 to about 115 square meters per gram. A preferred material is Aluminum Oxide C as described in Degussa's Technical Bulletin No 56.

It has been found that the finer phosphor is achieved by using less flux than had been previously used in producing the prior art phosphor such as the one described in Example 1, hereinafter, and sold by GTE Products Corporation at Towanda, Pa. under the trade designation of Type 246. In order to more fully illustrate the preferred embodiments of this invention, the following detailed examples are given. All parts, proportions and percentages are by weight unless otherwise given.

EXAMPLE 1

A formulation is prepared according to data given in Table 1.

TABLE 1

| Material | Moles | Typical Batch Weight (Kg) |
|---|---|---|
| Al(OH)$_3$ | 11 | 762 |
| MgO | 0.942 | 33 |
| BaF$_2$ | 0.24 | 38 |
| Eu$_2$O$_3$ | 0.06 | 18 |
| BaCO$_3$ | 0.39 | 67 |

The formulation is blended in a conventional blender to achieve relatively uniform distribution of the raw materials. The aluminum hydroxide used has an average particle size of about 14 micrometers.

The resulting admixture is fired at about 1650° C. in a mildly reducing atmosphere of about 5% H$_2$ balance N$_2$ for about 3 hours. The fired material is crushed and screened to remove aggregates or agglomerates larger than about 40 micrometers. The average particle size using Coulter Counter is about 9 micrometers. About 6 grams are required to coat a 40T12 test lamp. The material has to be milled with the lacquer media used to deposit the phosphor on the lamp in order to achieve a proper texture to the coating on the lamp.

EXAMPLE 2

The formulation technique of Example 1 is followed except the following formulation is used.

TABLE 2

| Material | Moles | Typical Batch Weight (Kg) |
|---|---|---|
| Al(OH)$_3$ | 11.00 | 766.5 |
| MgO | 0.942 | 33.5 |
| BaF$_2$ | 0.086 | 13.2 |
| Eu$_2$O$_3$ | 0.043 | 13.2 |
| BaCO$_3$ | 0.541 | 93.4 |

An aluminum hydroxide is used in the formulation which has an average particle size of about 13 micrometers. The admixture is fired as in Example 1. After firing the material is deagglomerated in a Sweco mill and about 4 parts of Degussa Aluminum Oxide C as described in the Degussa Technical Bulletin No 56 is added to about 996 parts of phosphor to achieve a concentration of about 0.4% by weight of aluminum oxide as a coating on the phosphor. While 0.4% by weight is especially preferred as a coating weight, from about 0.3% to about 1% can be used; from about 0.4% to about 0.6% being the preferred level of coating. This aluminum oxide has a sub-micron particle size and a BET surface area of from about 85 to about 115 square meters per gram. The fine aluminum oxide coats the particles and is believed to impart either a negative charge to neutralize the charge on the particles. In addition to enabling the deagglomeration to be achieved without appreciable particle size reduction, the aluminum oxide prevents adjacent particles from being reattracted or reagglomerated; thus, the smaller size which is achieved during the process is converted into a lower weight coating on the lamp. The resulting fluorescent lamp comprises a sealed envelope, a pair of opposing electrodes, a fill of inert gas, mercury and a coating on the internal walls of the envelope, produced said coating from the above blue emitting phosphor via stirring the phosphor into the conventional deposition media or lacquer used to coat the lamp. Only 3 grams of phosphor are required to yield a lamp that is equivalent in brightness to the lamp produced from the material of Example 1.

While there has been shown and described what considered the preferred embodiments of the invention, it will be obvious to those skilled in the art that various changes and modifications may be made therein without departing from the scope of the invention as defined by the appended claims.

What is claimed is:

1. A process for producing a phosphor, comprising the steps of:
   a) forming a relatively uniform admixture of (1) a source of aluminum oxide, (2) a source of magnesium oxide, (3) barium halide, (4) a source of europium oxide, and (5) barium carbonate, wherein the atomic ratio of magnesium to aluminum in said admixture is 0.942:11 and the atomic ratio of europium to aluminum is from 0.086:11 to 0.12:11 and the atomic ratio of barium to aluminum is from about 0.6:11 to about 0.65:11 and the molar ratio of said barium halide to barium carbonate is from about 14:86 to about 16:84;
   b) firing said admixture at a temperature of from about 1625° C. to about 1675° C. for at least about 3 hours in a mildly reducing atmosphere of hydrogen-nitrogen to form a fired material; and
   c) dry milling said fired material by vibratory milling of said fired material in the presence of a finely divided aluminum oxide having a particle size below 1 micron and a surface area of from about 85 to about 115 square meters per gram to thereby crush and deagglomerate said fired material to form particles of said fired material and coat said particles with a coating of finely divided aluminum oxide sufficient to impart stir-in qualities to said phosphor.

2. A process according to claim 1 wherein said finely divided aluminum oxide constitutes from about 0.3% to about 1% by weight of the total phosphor composition.

3. A process according to claim 1 wherein said finely divided aluminum oxide constitutes from about 0.4% to about 0.6% by weight of the total phosphor composition.

4. A process for producing a phosphor, comprising the steps of:
   a) forming a relatively uniform admixture of (1) a source of aluminum oxide, (2) a source of magnesium oxide, (3) barium halide, (4) a source of europium oxide, and (5) barium carbonate, wherein the atomic ratio of magnesium to aluminum in said admixture is 0.942:11 and the atomic ratio of europium to aluminum is 0.12:11 and the atomic ratio of barium to aluminum is from about 0.6:11 to about 0.65:11 and the molar ratio of said barium halide to barium carbonate is from about 14:86 to about 16:84;
   b) firing said admixture at a temperature of from about 1625° C. to about 1675° C. for at least about 3 hours in a mildly reducing atmosphere of hydrogen-nitrogen to form a fired material; and
   c) dry milling said fired material by vibratory milling of said fired material in the presence of a finely divided aluminum oxide having a particle size below 1 micron and a surface area of from about 85 to about 115 square meters per gram to thereby crush and deagglomerate said fired material to form particles of said fired material and coat said particles with a coating of finely divided aluminum oxide sufficient to impart stir-in qualities to said phosphor.

5. A process for producing a phosphor, comprising the steps of:
   a) forming a relatively uniform admixture of (1) a source of aluminum oxide, (2) a source of magnesium oxide, (3) barium halide, (4) a source of europium oxide, and (5) barium carbonate, wherein the atomic ratio of magnesium to aluminum in said admixture is 0.942:11 and the atomic ratio of europium to aluminum is 0.086:11 and the atomic ratio of barium to aluminum is from about 0.6:11 to about 0.65:11 and the molar ratio of said barium halide to barium carbonate is from about 14:86 to about 16:84;
   b) firing said admixture at a temperature of from about 1625° C. to about 1675° C. for at least about 3 hours in a mildly reducing atmosphere of hydrogen-nitrogen to form a fired material; and
   c) dry milling said fired material by vibratory milling of said fired material in the presence of a finely divided aluminum oxide having a particle size below 1 micron and a surface area of from about 85 to about 115 square meters per gram to thereby crush and deagglomerate said fired material to form particles of said fired material and coat said particles with a coating of finely divided aluminum oxide sufficient to impart stir-in qualities to said phosphor.

* * * * *